Aug. 6, 1929.  W. W. KELLETT  1,723,974
AIRPLANE LANDING
Filed March 23, 1927   2 Sheets-Sheet 2

WITNESS:

INVENTOR
William W. Kellett
BY
Augustus B. Stoughton
ATTORNEY.

Patented Aug. 6, 1929.

1,723,974

UNITED STATES PATENT OFFICE.

WILLIAM W. KELLETT, OF PHILADELPHIA, PENNSYLVANIA, ASSIGNOR TO B. B. T. CORPORATION OF AMERICA, OF PHILADELPHIA, PENNSYLVANIA, A CORPORATION OF DELAWARE.

AIRPLANE LANDING.

Application filed March 23, 1927. Serial No. 177,569.

Airplane landings at night are usualy illuminated by means of a floodlight in order to facilitate airplane pilots in landing. However, in making a landing pilots are frequently compelled, for example by reason of the direction of the wind, to face the source of the floodlight which, shining directly in their eyes, tend to blind them with the result that accidents are likely to happen.

One of the objects of the present invention is to avoid the difficulty above referred to and to provide for indicating to pilots not only the direction in which to land having regard to the direction of the wind, but also the place at which to land without being subjected to the effect of blinding light.

To these and other ends hereinafter set forth the invention, stated in general terms, comprises an airplane landing including a field, a floodlight adapted to illuminate the field, and a shade movable in respect to the light and adapted to cut off a portion of the light, thereby providing a dark shadow or path indicative of the place and direction of landing.

The invention also comprises the improvements to be presently described and finally claimed.

In the following description reference will be made to the accompanying drawings forming part hereof and in which Figure 1 is an elevational view, partly in section, on the line 1—1 of Fig. 2.

Figure 3:
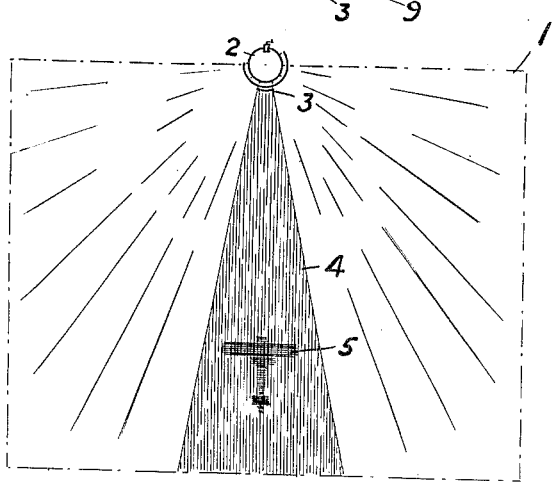
Fig. 3 is a diagrammatic view of an airplane landing embodying features of the invention.

Referring to Fig. 3, 1 indicates a field such as constitutes a part of an airplane landing. 2 is a floodlight shown as disposed marginally of the field and adapted to illuminate the latter. 3 is a shade movable in respect to the floodlight and adapted to cut off a portion of its illumination to provide a dark shadow or locality 4 for indicating the place and direction of landing. As is indicated is Fig. 3, the pilot of an airplane 5 is not subjected to the glare of the floodlight, and the location of the shadow or dark path 4 advises the pilot in what direction to land because an attendant moves the shade 3 with regard to the direction of the wind into the proper position so that when the pilot lands and follows the dark shadow or path, he approaches into the wind.

Figure 1:
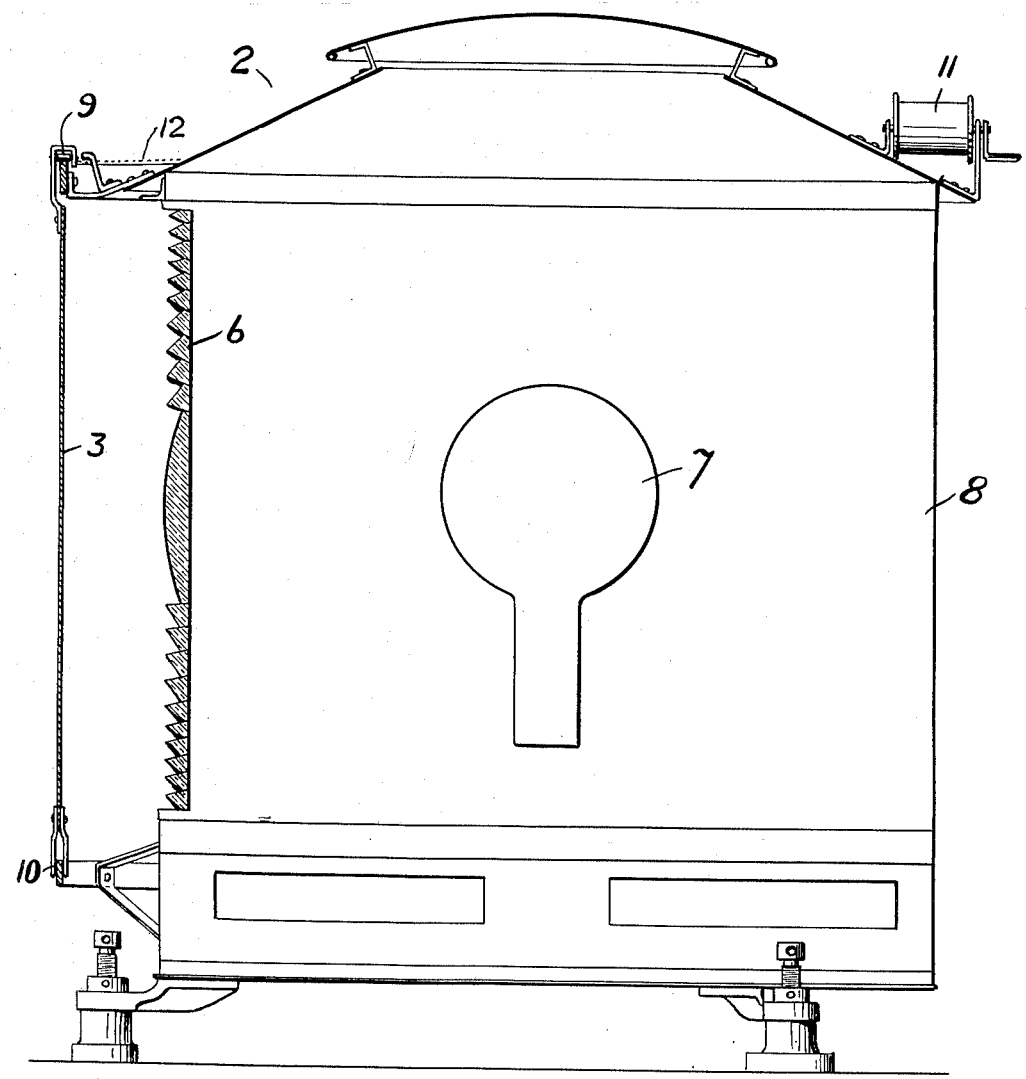
Figure 2:
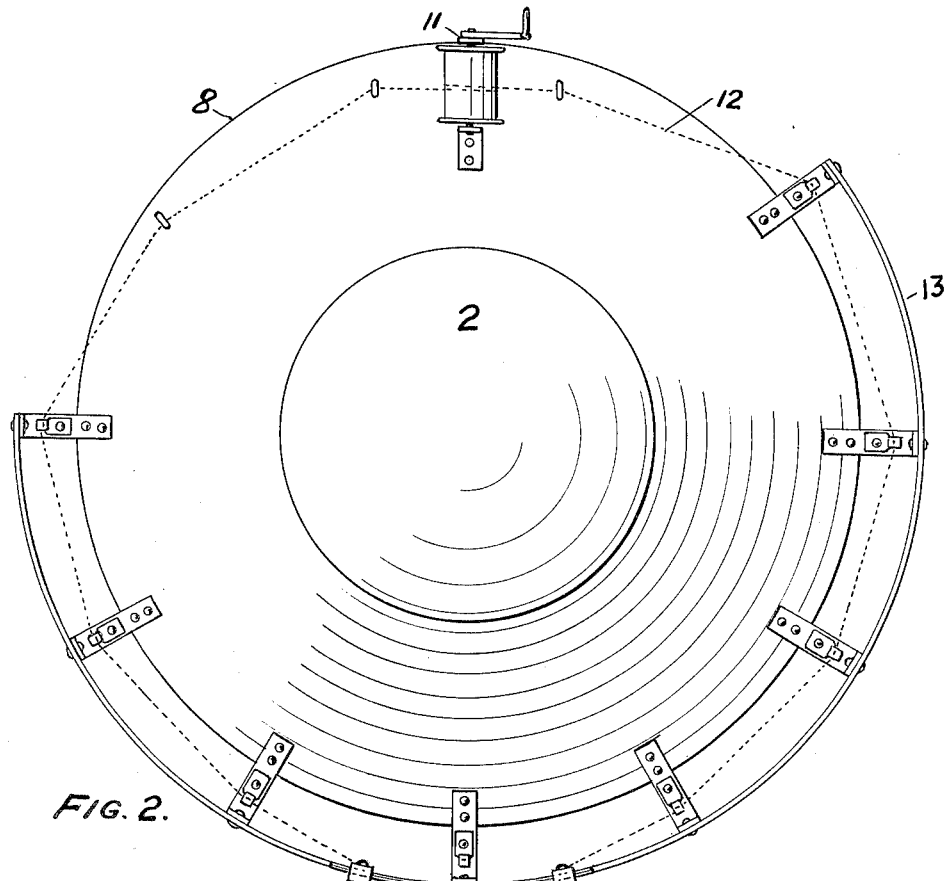
Fig. 2 is a top or plan view of Fig. 1.

The light 2 is provided with a semi-circular lens 6 and with a source 7 and with a proper housing or lantern 8. The shade 3 is of substantially less width than the lens and is movable circumferentially of the light and in respect to the lens. As shown the shade is supported at the top of the light by overrunning trolley mechanism 9, and is guided at the bottom of the light by a guide mechanism 10 shown to comprise a ring and a guide fork. The winch 11 and cable 12 afford means for positioning the shade 3 in front of the lens at any desired point and also for shifting the shade clear of the lens by putting the shade into the position indicated generally at 13 in Fig. 2.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. An airplane landing floodlight having a semicylindrical lens, a shade of substantially less width than the lens, overrunning trolley mechanism at the top of the light for the shade, and guide mechanism at the bottom of the light for the shade, and a winch and cable for shifting the shade.

2. For an airplane landing, a fixed flood light means arranged at one edge of an area so as to constantly illuminate the area in front of the flood light and to screen light from the area behind the flood light, in combination with light obscuring means movable around the fixed flood light means for obscuring a portion of the illumination of the flood light means to provide a single dark path for indicating the place and direction of landing.

3. For an airplane landing, a fixed flood light arranged at one edge of an area for illuminating the area in front of the flood light and to screen light from the area behind the flood light, and having a light screen movable in respect to the fixed flood light to provide a single dark path in the lighted area, and manual means for shifting the screen to make the dark path radiate from the flood light to various portions of the illuminated area.

WM. WALLACE KELLETT.